H. JÜNGHANS AND F. GLOGAUER.
METHOD OF PRODUCING VISIBLE SIGNALS AND ADVERTISEMENTS ON WATER SURFACES.
APPLICATION FILED JUNE 7, 1922.
1,428,639.
Patented Sept. 12, 1922.
3 SHEETS—SHEET 1.
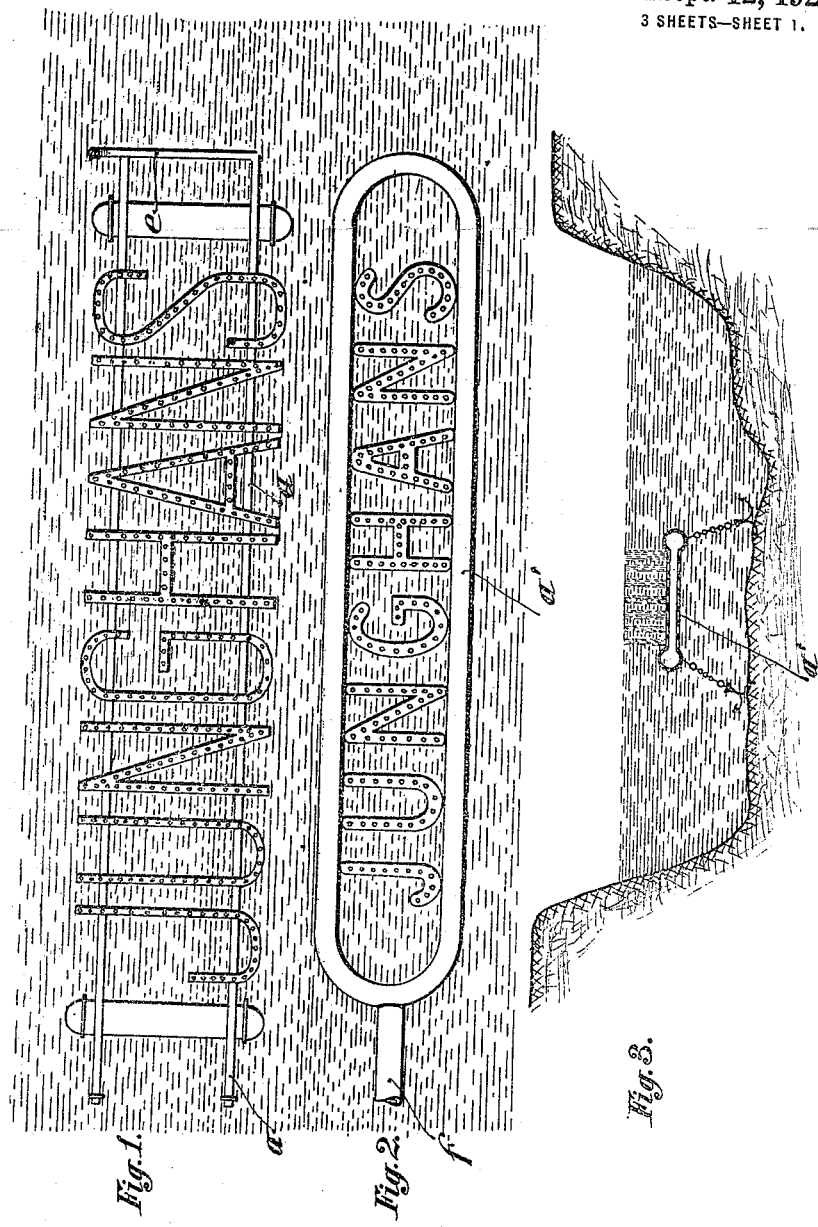
Inventors
Helmut Jünghans
and Fritz Glogauer
By [signature]
Attorney

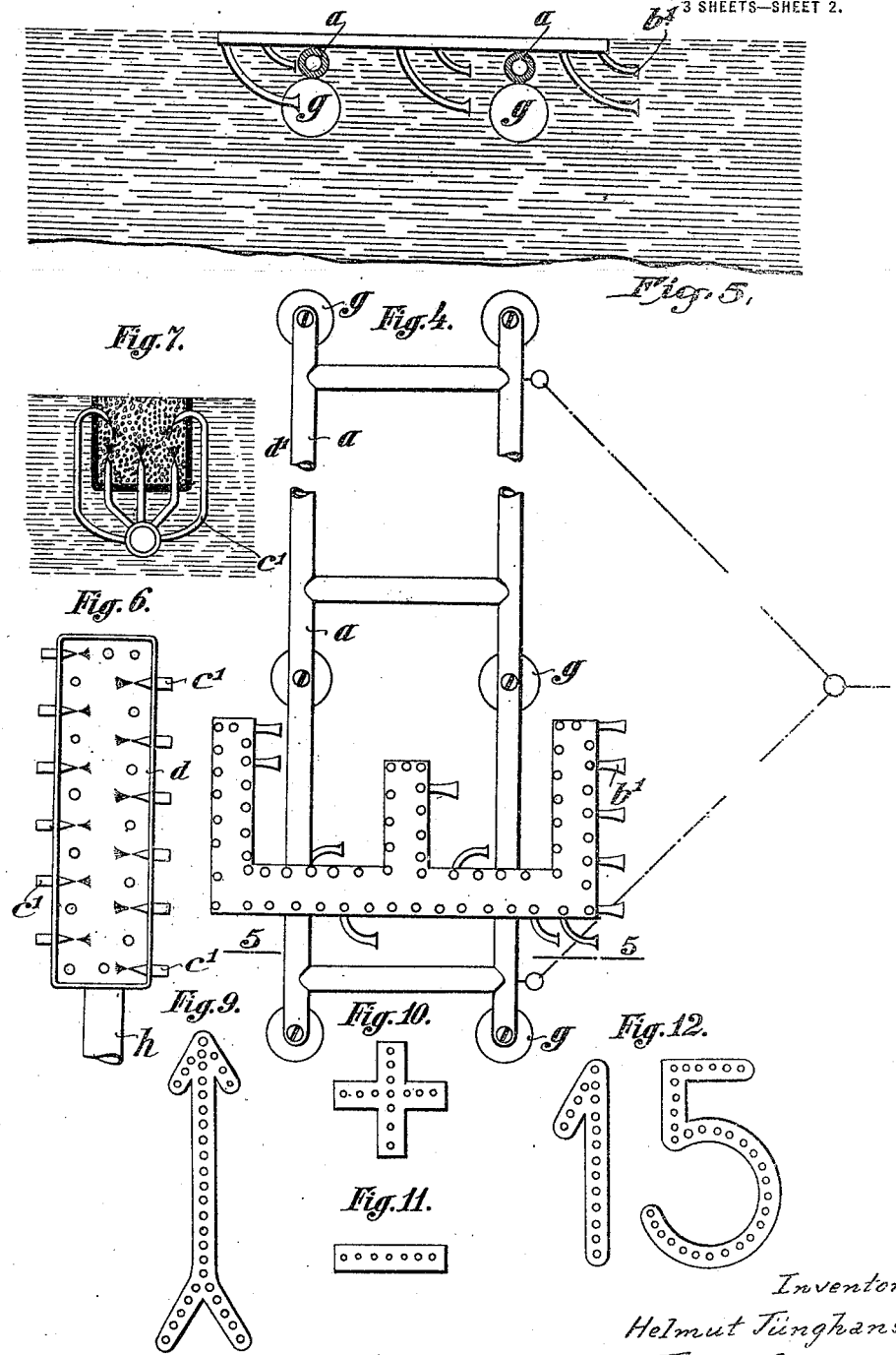

Patented Sept. 12, 1922.

1,428,639

UNITED STATES PATENT OFFICE.

HELMUT JÜNGHANS, OF SCHRAMBERG, GERMANY, AND FRITZ GLOGAUER, OF CINCINNATI, OHIO.

METHOD OF PRODUCING VISIBLE SIGNALS AND ADVERTISEMENTS ON WATER SURFACES.

Application filed June 7, 1922. Serial No. 566,668.

*To all whom it may concern:*

Be it known that we, HELMUT JÜNGHANS and FRITZ GLOGAUER, citizens of the German Republic, and the United States, respectively, residing at the Farm Berneck, near Schramberg, Germany, and 2201 Easthill Avenue, in the city of Cincinnati, Ohio, have invented certain new and useful Improvements in Methods of Producing Visible Signals and Advertisements on Water Surfaces, of which the following is a specification.

Our invention relates to a new method and means for exhibiting bubbling advertisements and for similar purposes and the main object of our invention is to provide an apparatus for producing signs, figures, pictures and the like on water surfaces for advertising and similar purposes without impairing the general aspect of the landscape or scenery as heretofore has been the case in advertisements erected in natural scenery and comprising advertising figures, signs and the like which are made of a system of rods, tubes, poles or structures of similar kind.

Our invention involves a new method in which a fluid such as water, air, gas or the like is forced through the water by means of tubes or a system of perforated tubes or channels configured to form the required advertisement, mounted on a suitable container or a frame which is located in any body of water—river, pond, lake, sea, where the advertisement or sign is to be exposed— below the level thereof, so that neither the said tubes or system nor the parts supporting the latter will be visible to spectators. As soon, however, as air, water, gas or the like is forced through said tubes or system the effects produced thereby at the surface of the water will be visible to the spectator. Thus in case of employing water or air as an agent for producing visible effects, the surface of the water at the place where an apparatus embodying our invention is located, will be whirled and moved so as to produce bubbles and foam. Since the whitish, light foam extends over the whole of the length or area of the perforated tubes or channels forming the advertising system of the apparatus, the spectators' eyes receive a corresponding image of the configuration of the latter, that is to say, if for example the said tubes or channels are given, as a whole, the shape of the word "Stop" the spectator will read this word on the surface of the water.

In lieu of water or air some other fluid may be employed which is adapted to emanate from the surface of the water in the form of a visible smoke or mist, or even a gas may be utilized which is adapted to ignite when in contact with air so that a flame or light is produced at the level of the water and the spectator will see a luminous signal or advertisement on the surface of the water.

For the latter purpose preferably phosphine such as obtained by the decomposition of calcium phosphide may be employed, but as these chemical compounds are too expensive, they cannot be used for a continuous advertisement or sign at night. For this reason our invention provides the employment of a cheap combustible gas in combination with phosphine, the latter serving as a mere igniting agent and being supplied to a moderate amount and by preference intermittently only.

The generation of the combustible gas and of the igniting gas may be effected in any suitable manner, as heretofore known, and the apparatus employed for the purpose may be of any appropriate construction and provided with automatic means for a continuous or an intermittent discharge of the two gases in order to ensure the desired result.

The invention is intended for use in the neighbourhood of public roads, highways and routes either for advertising purposes in a commercial sense, or for public warnings, directions and the like.

With this and other objects in view the invention consists of certain novel features of construction, and the combination and arrangement of parts as will be more fully described with reference to the accompanying drawings, wherein—

Figure 1 is a top view of a structure embodying the invention.

Figure 2 is a similar view of the structure in a modified form and arrangement.

Figure 3 is a vertical cross-section of the modification shown in Figure 2 located in a creek and firmly anchored to the ground.

Figure 4 is a top view of a further modification of the structure or apparatus, partly broken away and with certain parts omitted the apparatus being constructed and provided with means for connection with a boat or ship, in order to be towed or tugged by the latter.

Figure 5 is a cross-section on line 5—5, Fig. 4.

Figure 6 is a top view of a modification wherein the structure is made of channel like members, each provided with a supply-pipe for a pressure fluid below its bottom, said pipe having a number of branch-pipes connected with the channel-like member and adapted to inject therein the pressure fluid or the like and Figure 7 is a cross sectional view thereof.

Figure 8 is a sectional view of an embodiment of the invention in the form of a buoy constituting an apparatus for exhibiting a continuous or intermittent luminous signal on the surface of the water and Figures 9 to 12 show, by way of example, several forms of the figural nozzle or nozzles employed in connection with the buoy for producing the signal or advertisement.

Figure 8:
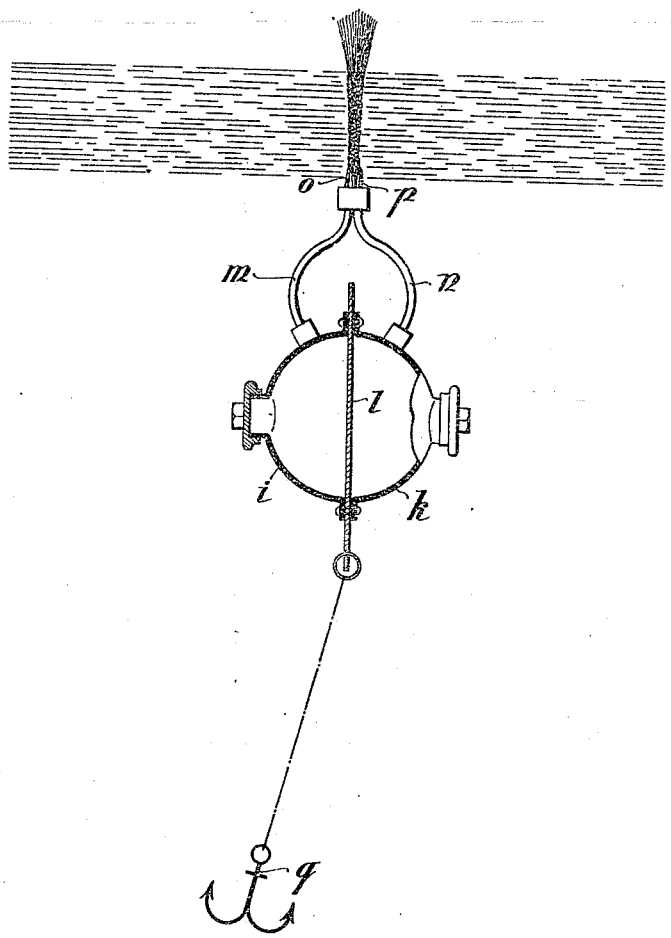

Referring now to the details, the apparatus illustrated in Figure 1 comprises a frame $a$ made of two parallel tubes closed at the one end and interconnected at the other end $e$. It is to be understood that this end is connected, with the aid of any suitable means (not shown) with any appropriate source for supplying an agent, such as water, air or the like under pressure. The frame $a$ acts as a support to carry the advertising structure, properly speaking, namely, figures or signs consisting of perforated tubes. In the example shown in Figure 1 the said tubes constituting the name "Junghans" are in the form of single pipes connected with the tubes of the frame $a$ so as to receive therefrom the pressure agent and to allow the latter to be discharged through numerous openings or perforations at the top side or face thereof, as will be clearly understood on inspection of the drawing.

As the apparatus when in use is supported on the ground so as to be kept in a horizontal plane a little below the level of the water, the numerous water streams, foam or air bubbles emanating from the perforated tubes produce on the surface of the water a clearly distinguishable image of the figure or figures represented by the apparatus.

In the embodiment shown in Figures 2 and 3 the tubular frame $a'$ consists of two parallel branches interconnected at both ends to form a closed circuit and having an admission pipe $f$ at the one end for the pressure fluid to be supplied to the apparatus in the direction indicated by the arrow. In the space between the two parallel branches the figures are inserted, each duly connected with the branches of the frame to receive the pressure fluid, as will clearly be understood from Figure 3.

As will be seen from Figure 3 the apparatus is anchored to the ground so as to be stationary in a horizontal plane a distance below the level of the water. The air or the like is supplied to the apparatus from a source on the bank of the creek, not shown, by means of suitable intermediate piping. Said source of supply may comprise a small power-operated pump or a battery of compressed air bottles and the necessary controlling means for the regulation of the supply and, if required, for automatic connection and change.

The figures or signs are preferably connected with the frame in a manner to permit removal and exchange thereof and they may be made of perforated tubes, as shown, or consist of tubes made of porous material, the pores of the latter allowing the forced-in air to escape therefrom in fine streams or bubbles. Instead of pressure air any other suitable fluid may be supplied to the apparatus provided that the same is adapted to produce at the surface of the water a visible appearance or image of the figures or signs representing the advertisement.

The frame and the figures or signs thereon preferably are coated with a paint of a colour similar to that of the water so that they will not be visible. If the figures or signs are arranged on the frame to be removable and exchangeable thereon, the advertisement can be readily changed at any time by mounting new figures or signs on or in the frame. Further, means may be provided for controlling the admission of the pressure fluid in a manner that either all of the figures or signs will become visible at once and permanently remain visible or that they appear in succession, that is one after the other, or disappear intermittently as is well known in advertisements hitherto exhibited in the open air. The said controlling means may be arranged to allow of manual operation and actuation at will or to act automatically.

Our experiments and trials have shown that the advertisements exhibited in the hereinbefore described manner are visible from a long distance and the impression on the eye is very fascinating, in particular when the apparatus has been arranged to cause the advertisement to appear intermittently, and in no case is the appearance of the surrounding landscape or scenery impaired by an advertisement of the described kind.

It is obvious that in order to obtain best results the amount of air to be forced through the apparatus must be accurately controlled and the pressure to be given to the air must be regulated so that the air will be discharged from the apparatus with a certain force. This control and regulation depend upon the size of, and the distance between, the single figures or characters and the distance at which the apparatus is positioned below the level of the water. It is not absolutely necessary that the water surface be smooth and quiet; even if the water is flowing evenly at a moderate rate the apparatus works to full satisfaction, the more so if the apparatus has been arranged to cause the advertisement to appear intermittently like a flash or for a somewhat more extended period.

The forced-in air is discharged uniformly and simultaneously from all openings, as shown in Figure 2, and consequently the bubbles reach the surface of the water at the same time. The larger the single figures or signs are and the greater the distance is between the single figures or signs, the more beautiful and fascinating is the effect. Satisfactory results are obtained when the length of the single figures or signs amounts to about three feet.

In the modification illustrated in Figs. 4 and 5 the figures or signs are mounted on a frame $a$ just as in Figure 1. But in this case a pressure fluid is not employed and the figures or signs, consequently, are only detachably connected with the frame $a$ in order to be supported by the latter without having any other connection therewith. The figures or signs are trough or channel shaped and the frame is provided with hollow bodies $g$ filled with air to keep the apparatus floating.

The embodiments shown in Figures 1 to 3 are for stationary use. The modification illustrated in Figures 4 and 5, however, is a movable apparatus adapted to be towed or tugged by a ship or boat, in order that the movement of the apparatus through or in the water may be utilized for the production of a visible motion of the water within the trough or channel shaped figures or signs. To this end short curved tubes $b'$ are inserted in the bottom of the troughs or channels, said tubes having flaring or funnel-shaped mouths projecting in the direction of the travel of the apparatus when towed by a ship. The other ends of the tubes $b'$ open into the channel or trough. As the tubes $b'$ of the floating apparatus are entirely surrounded by water, the flaring ends thereof receive a certain amount of water which, owing to the movement of the apparatus, is forced through the tubes into the channel or trough shaped bodies to assume therein a foamy condition, whereby the water in and over the figures or signs is distinguished in its appearance from the surface of the outer water and the figures or signs, therefore, are visible on the surface of the water.

Figures 6 and 7 illustrate a modification of the apparatus for stationary use, which to a certain extent is similar to that shown in Figures 4 and 5. Each single figure or sign consists of a channel or trough shaped member $d$ having a large number of injecting pipes $c'$ provided in its walls. All these pipes are connected with a main pipe or conduit $h$ through which a fluid under pressure is forced into the branch pipes $c'$ and the inner space of the trough shaped member for the purpose of generating foam therein. In this embodiment the production of bubbles and foam depends upon the pressure of the fluid agent and consequently suitable means must be provided by which the pressure can be easily regulated.

The embodiments shown in Figures 4 to 7 are preferably intended to float on the water flush with the surface thereof, that is to say, the upper edges of the trough shaped figures or signs should lie at the level of the water. In some cases the tubes $b'$ in Figures 4 and 5 may be dispensed with and in lieu thereof the walls of the trough or channel shaped bodies may be simply perforated so that, when the apparatus is towed by a ship or boat foam and bubbles are produced in the troughs or channels of the bodies by the water entering the latter through the perforations. The apparatus shown in Figures 4 and 5 may also be constructed and arranged to allow of being actuated independently of the movement of the ship or boat, when the latter is moored and at rest.

Figure 8 shows the modification of the apparatus for a luminous signal or advertisement, in particular for use as a signal-fire and guide in the maritime traffic. In contradistinction to the fire-buoys heretofore employed the new signalling buoy affords an important advantage. The hitherto used buoys are hollow bodies floating on the surface of the water, while a signal-buoy made according to our invention can be anchored to the ground to remain so far below the level of the sea that there is no danger of any detrimental collision with a vessel passing the place of anchorage.

As will be seen from Figure 8 the buoy comprises a globular hollow body with a discharging means at the top and an anchoring means at the bottom. The hollow body is composed of two halves $i$ and $k$ with a partition $l$ between them and riveted together to form two separate air tight chambers. The one chamber serves for the reception or generation of a combustible gas such as acetylene, the other one serves for the reception or generation of an ignition gas, such as phosphine. The two chambers are provided with discharge tubes *m* and *n*, respectively rigidly connected together at their upper ends, so that the two nozzles *o*, *p* of the tubes are in closest proximity to each other.

In operation the combustible gas, acetylene or the like, is discharged through the one nozzle while the ignition gas is discharged through the other nozzle and, on reaching the level of the water and passing over into the air, ignites at once and acts to set the combustible gas on fire and to keep it burning. Suitable means, such as an adjusting or set-valve, may be provided for keeping the discharge of the valuable ignition gas as low as possible and further automatic means may be provided for allowing the said gas to escape periodically or intermittently only to ensure a further saving.

Figure 8 discloses the embodiment in a more or less diagrammatic manner for the production of a simple light or fire-signal. It goes without saying that in lieu of the nozzles *o* and *p* more complicated signalling or advertising structures may be employed, such as shown for example in Figures 9 to 12 and resembling in their general appearance the advertising figures and signs hereinbefore described. These structures are hollow or channel shaped bodies with perforations as before stated. The tubes *m* and *n*, Fig. 8, are connected with the arrow shaped signalling body shown in Fig. 9—or with any other body of the sort and of any desired shape and configuration—so that the latter takes the place of the simple nozzles *o* and *p* in Fig. 8 and the fire signal or advertisement produced thereby will have and show the particular form of an arrow or any other special form in accordance with the particular shape of the hollow or channel shaped body employed.

The tubes *m* and *n* may be connected with the hollow signalling body, such as shown in Figs. 9 or 10, either immediately or by means of suitable conducting pipes. In either case the construction must be such that the discharge ends of the tubes or pipes for the delivery of combustible gas and ignition gas are located in close proximity to each other and the more contiguous to each other they are, the more readily the ignition will take place.

The connection of the buoy shown in Fig. 8 with the ground is effected in the usual manner by means of an anchor *q* and a chain which preferably may be attached to an extension of the partition *l*.

As hereinbefore stated the two chambers *i* and *k* of the buoy are intended to either receive or generate the respective gases. In case they are filled with gas prior to the anchoring of the buoy at its place of destination, the gas is to be pumped or otherwise forced in under heavy pressure in order to utilize the capacity of the chambers in the most profitable way. If it is desired to generate the gas within the chambers the latter are filled with e. g. calcium carbide and calcium phosphide, respectively, for the production of acetylene—the combustible gas—and of phosphine—the ignition gas—and means are provided in the two chambers for continuously supplying a small amount of water to the chemical compounds for the purpose of decomposing the latter and generating the desired gas in an uninterrupted manner. The said means do not require description since they are generally known in the art and in particular in use with acetylene lamps and similar apparatus.

If it is desired to produce a smoke or mist signal of advertisement of the kind, instead of the luminous effect, phosphorous pentoxide may be used in a similar manner. It is admitted that the chemical substances available for the purposes of our invention and the particular properties thereof are known in the art and are not claimed except as regards their utilization for the described advertising or signalling purposes.

While we have described a particular construction of apparatus, it is obvious that it can be modified without departing from the spirit of our invention which evidently includes within its purview such changes as may be made within the scope of the appended claims.

What we claim, is:

1. A method of producing visible signs of predetermined outline on water surfaces, comprising directly agitating the water, while confining such agitation to lines which conjointly form the graphic outline of the sign; substantially as described.

2. A method of producing visible signs of predetermined outline on water surfaces, comprising agitating the water at a point below the surface, while confining such agitation to lines exactly following the graphic outline of the sign, whereby said outline will be repeated at the surface of the water; substantially as described.

3. A method of producing visible signs of predetermined outline on water surfaces, comprising forming bubbles within the water below the surface thereof, while confining such formation solely to definite lines which conjointly correspond to the graphic outline of the sign, whereby the ascending bubbles will repeat said outline at the surface of the water on reaching the same; substantially as described.

4. A method of producing visible signs of predetermined outline on water surfaces, comprising forming the component graphic parts of the sign by agitating the water along definite lines which simulate the outline of such parts; substantially as described.

5. The herein-described method, comprising forming gas bubbles in a body of water along definite lines which conjointly graphically reproduce the outline of a predetermined sign to be displayed.

6. The herein-described method, comprising liberating bubbles of combustible gas at the surface of a body of water along definite lines which conjointly reproduce the outline of a predetermined sign to be displayed, and igniting the bubbles as liberated.

7. The herein-described method, comprising liberating a mixture of bubbles of combustible gas and of ignition gas at the surface of a body of water, while confining such liberation to the outline of a predetermined sign to be displayed, whereby the bubbles of ignition gas on being exposed to air at the surface of the water will become ignited and will ignite the bubbles of combustible gas, so that said outline will be graphically repeated at the water surface.

8. A method of producing visible signs of predetermined outline on water surfaces, comprising discharging a fluid from a point below the surface to the surface, while confining the discharge solely to definite lines which conjointly reproduce the graphic outline of the sign; substantially as described.

9. A method of producing visible signs of predetermined outline on water surfaces, comprising discharging a gaseous fluid from a point below the surface to the surface, while confining the discharge solely to definite lines which conjointly reproduce the graphic outline of the sign; substantially as described.

10. Apparatus for producing visible signs of predetermined outline on water surfaces, comprising means exactly simulating in its shape the graphic outline of the sign to be displayed, and means directly associated with the first-named means for effecting agitation of the water solely along definite lines conforming to the precise shape of said first-named means; substantially as described.

11. Apparatus for producing visible signs of predetermined outline on water surfaces, comprising means for effecting an agitation of the water, while confining such agitation solely to areas which conjointly correspond to the precise graphic outline of the sign to be displayed; substantially as described.

12. Apparatus for producing visible signs of predetermined outline on water surfaces, comprising means for discharging bubbles below the surface of the water along definite lines which conjointly form a graphic representation of the sign to be displayed, whereby the ascending bubbles will reproduce such representation at the surface; substantially as described.

13. Apparatus for producing visible signs on water surfaces, comprising a hollow member having an open area of definite figural shape, and means for introducing a fluid into said member to be discharged through said open area so as to produce a surface agitation of the water which graphically reproduces the shape of such area; substantially as described.

14. Apparatus of the character described, comprising a member adapted for disposition in a body of water and having an open portion of predetermined shape, and means associated with said member for producing at the surface of the water a graphic representation of the shape of said open portion; substantially as described.

15. Apparatus of the character described, comprising a member adapted for disposition in water, and means associated with said member for graphically producing at the surface of the water a sign to be displayed; substantially as described.

In testimony whereof we have affixed our signatures.

HELMUT JÜNGHANS. [L. S.]
  FRITZ GLOGAUER. [L. S.]
Witnesses:
  OTTO WAGNER, [L. S.]
  IKTOR BENTZ. [L. S.]

Certificate of Correction.

It is hereby certified that the name of the first-mentioned patentee in Letters Patent No. 1,428,639, granted September 12, 1922, for an improvement in "Methods of Producing Visible Signals and Advertisements on Water Surfaces," was erroneously written and printed as "Helmut Jünghans," whereas said name should have been written and printed *Helmut Junghans;* and that the said Letters Patent should be read with this correction therein that the same may conform to the record of the case in the Patent Office.

Signed and sealed this 16th day of January, A. D., 1923.

[SEAL.]

KARL FENNING,

*Acting Commissioner of Patents.*